E. T. HORSEY.
VULCANIZER.
APPLICATION FILED JULY 7, 1916.
1,311,560.
Patented July 29, 1919.
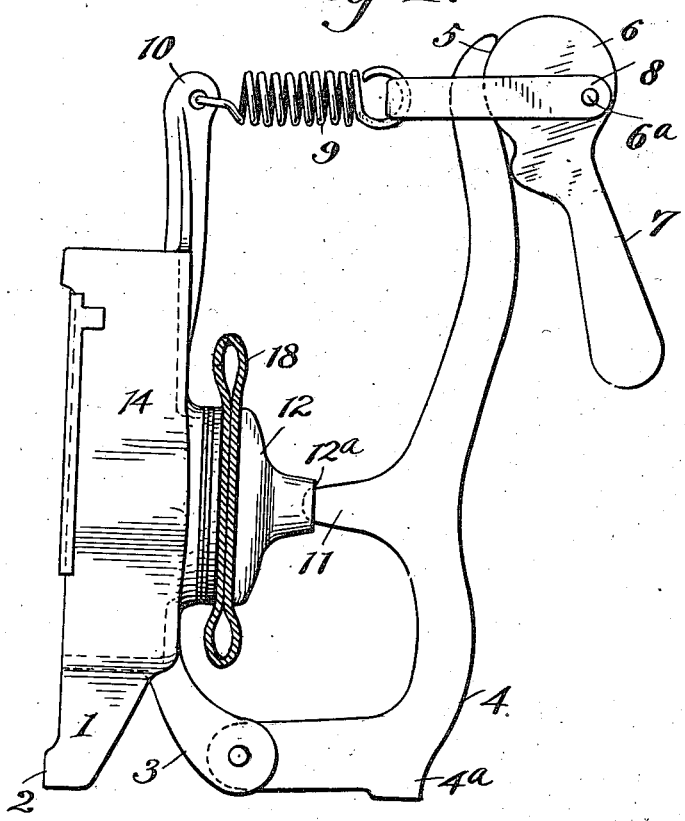
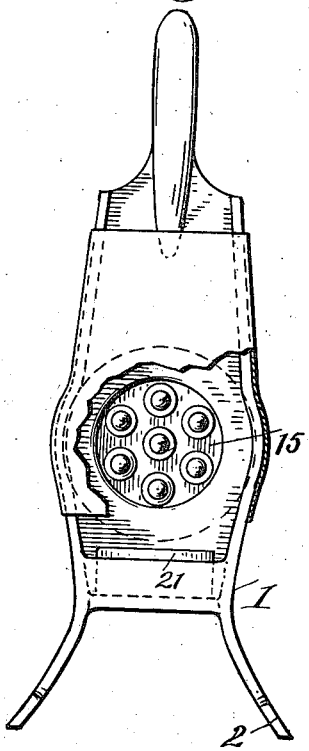
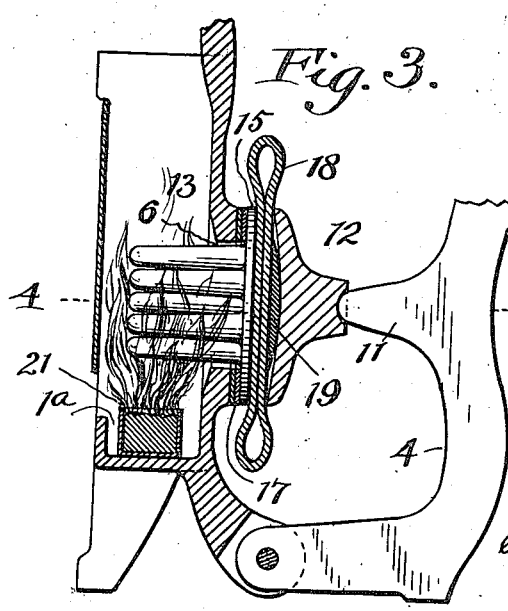
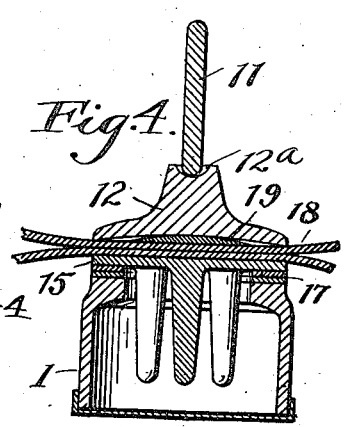
Inventor:
Edgar T. Horsey
by Thurston & King
attys.

UNITED STATES PATENT OFFICE.

EDGAR T. HORSEY, OF CLEVELAND, OHIO.

VULCANIZER.

1,311,560.  Specification of Letters Patent.  Patented July 29, 1919.

Application filed July 7, 1916. Serial No. 107,899.

*To all whom it may concern:*

Be it known that I, EDGAR T. HORSEY, a citizen of the United States, residing at Cleveland, in the county of Cuyahoga and State of Ohio, have invented a certain new and useful Improvement in Vulcanizers, of which the following is a full, clear, and exact description.

The invention described in this application is directed to a vulcanizer, and while the particular embodiment herein disclosed is that of a portable vulcanizer more especially intended for the vulcanizing of tubes and tires, it will be apparent as the description proceeds that the invention is not limited to the precise form shown.

The object of the invention is to provide a vulcanizer in which the plate or equivalent device which supplies heat to the rubber to be vulcanized, is so mounted with respect to the parts adjacent and which support it that the heat is confined to this plate, thus conserving the heat and further preventing the adjacent parts of the vulcanizer from becoming highly heated.

A further object of the invention is to provide a vulcanizer in which a definite quantity of heat, if we may term it that, is applied in the heating of the vulcanizing plate.

Generally speaking, the invention may be said to comprise the elements and combinations thereof set forth in the accompanying claims.

Reference should be had to the accompanying drawings forming a part of this specification, in which Figure 1 is a side elevation of the vulcanizer; Fig. 2 is a rear elevation of the vulcanizer; Fig. 3 is an elevation with portions of the vulcanizer in section; and Fig. 4 is a transverse section through portions of the device.

The base of the vulcanizer is generally represented at 1. This base is provided with feet, such as are represented at 2, which permit the base to be laid flat upon a surface when the material to be vulcanized is arranged and placed in the vulcanizer.

The base has extending therefrom an arm 3 upon which is pivoted a lever 4. This lever is provided with a slight foot extension 4ᵃ so that the vulcanizer may be supported in the position shown in Fig. 1. This position of the vulcanizer is desirable inasmuch as in vulcanizing such an article as an inner tube of a tire it is desirable to so place this tube that it will not be in danger of being burned, or even unduly heated by contact with any part of the vulcanizer structure which may become heated as the vulcanizer is operated. The position of the vulcanizer as shown in Fig. 1 permits the tube to be drawn back and away from the base 1 and the parts adjacent thereto.

The end of the lever 4 is provided with a depressed portion having a rounded surface as indicated at 5. This depressed portion coöperates with a cam-shaped member 6 having a handle 7. The cam-shaped member has pivoted to it a strap 8 which is of a U-shape and straddles the lever 4 at the end thereof, as well as the cam-shaped member 6. The strap is pivoted as indicated at 6ᵃ being eccentric with respect to the center point of the cam-shaped member 6.

The strap 8 is secured at one end of a spring 9, this spring at its opposite end being secured to an extension 10 which is carried by the base. When the cam-shaped member 6 is in the position shown in Fig. 1 the spring 9 is under tension and the lever 4 is held by the arrangement of elements which have been described.

The lever 5 between the ends thereof is provided with an inward extension 11. This extension coöperates with a presser plate member 12. This member 12 is provided with a depression 12ᵃ with which the projection 11 coöperates.

The base 1 is provided with an opening 13. Through this opening there extend portions of a hot plate member which is generally represented at 14. This hot plate member consists of a plate proper 15 from which extend pins or fins 16. These parts 16 extend through the opening 13 in a manner indicated in Fig. 3. The plate 15 is heat insulated from the portion of the base 1 upon which it rests by means of washer members 17 which are made of any suitable heat insulating material. The opening 13 through the base 1 is so positioned with respect to the presser plate member 12, that the plate 15 of the hot plate 14 will come directly beneath the presser plate 12 so that as the lever 4 operates upon the presser plate 12 it will center this plate 12 with respect to the hot plate 14.

Heat is applied to the pins or fins 16. The heat thus applied to these members will be conducted directly to the plate proper 15, and from this plate conducted to the article to be vulcanized, which in the instance shown is an inner tube for a tire, as indicated at 18, to which a patch indicated at 19 is to be vulcanized. Applying the heat to the fins or pins 16 insures that the heat is directly given to the hot plate 15, and in fact the structure thus heated is heat insulated from the rest of the structure comprising the vulcanizer, and insures the confining of nearly all of the heat to the hot plate and prevents the dissipation of the heat through the structure of the vulcanizer.

This overcomes a great objection, for in many types of small vulcanizers the heat dissipates through the vulcanizer body heating the same, which not only wastes heat, but heats the metal structure of the vulcanizer to such an extent that if the tube or rubber article being vulcanized comes into contact with the metal parts of the vulcanizer, the tube is burned, and some times so injured as to destroy the tube.

By insulating the heating plate 15 the surrounding parts of the vulcanizer structure will never become so hot as to damage the tube if perchance it should come in contact with it.

The body or base 1 is provided with a pocket portion 1ª as indicated in Fig. 3. This body portion is adapted to receive a heat supplying device which preferably is a heating unit or cartridge 21. This heating unit or cartridge is prepared by inclosing a combustible material within a suitable container which preserves the combustible material against dissipation until such time as part or all of the containing wrapper is removed for the purpose of igniting the combustible material.

The quantity of combustible material comprising a cartridge is a definitely ascertained quantity which will flame up around the pins 16 and supply the requisite amount of heat to the pins or fins 16, and thence to the hot plate 15, to effect the proper vulcanization of the article being vulcanized. For instance, it can be definitely ascertained the proper time that heat should be applied to such a tube as the tube 18 when it is desired to vulcanize such a patch as 19 to the tube. This time of heating being ascertained the quantity of combustible material comprising the cartridge 21 can be determined. Therefore, if such a cartridge as 21 be used each time it is desired to vulcanize a patch to a tube, the requisite amount of heat, for the proper length of time can be applied to the patch and tube, and thus insure a proper vulcanizing without danger of overheating the patch and tube.

A cover 25, having resilient prongs may be utilized to inclose the space occupied by the flame from the heat supplying means. This cover is readily removable.

It will be apparent that various details of construction may be varied without departing from the spirit of the invention.

Having thus described my invention, what I claim is:

1. A vulcanizing apparatus comprising a base member, a hot plate carried by the base member, means for heat insulating said hot plate from the base, a plurality of fingers of heat conducting material secured to the hot plate, means for supplying heat to the said fingers, a presser plate, and means for holding said presser plate in proper position with respect to the hot plate.

2. A vulcanizer comprising a base member, an opening through said base member, a hot plate supported from the base member, means for heat insulating said plate from the base member, pins of heat conducting material connected with the said hot plate said pins extending through the said opening in the base, means beneath the pins for supplying heat to the pins, a presser plate, and means for holding the presser plate in proper position with respect to the hot plate.

3. A vulcanizer comprising a base member said base member being provided with spaced side walls, an opening in said base member, a hot plate overlying said opening, means for insulating said hot plate from the base, heat retaining and conducting members connected with the hot plate and extending through the said opening in the base and also extending between the said walls, means for supporting a heating unit between the walls of the base and beneath the aforesaid heating, retaining and transmitting means, a presser plate coöperating with the hot plate, and means for holding the presser plate in proper position with respect to the hot plate.

4. A vulcanizer comprising a base member provided with spaced walls there being an opening in said base member, a hot plate overlying said opening, means for insulating said hot plate from the base, a plurality of fingers made of heating, conducting material which fingers are carried by the hot plate said fingers extending through said opening and between the spaced walls of the base, means for supporting a heating device between the walls of the base and beneath the aforesaid pins, a presser plate coöperating with the hot plate, and means for holding the presser plate in proper position with respect to the hot plate.

5. A vulcanizer comprising a base, a hot plate member supported from the base, and provided with heat conducting fingers, means for insulating said hot plate member from the base, a presser plate member coöperating with the hot plate member, means for holding said members in proper relative positions; means for supporting a heating unit adjacent the fingers of the hot plate member whereby the heating unit delivers its heat substantially only to the hot plate member through the heat conducting fingers.

6. A vulcanizer comprising a base, having an opening therein, a hot plate member supported from the base and overlying said opening, said hot plate being provided with heat conducting members which extend through the opening, means for heat insulating said hot plate member from the base, a presser plate member coöperating with the hot plate member, means for holding said members in proper relative positions; a heating cartridge supported adjacent the said heat conducting fingers whereby the cartridge delivers its heat substantially only to the hot plate member.

In testimony whereof, I hereunto affix my signature.

EDGAR T. HORSEY.